US007630810B2

(12) United States Patent
Guderzo

(10) Patent No.: US 7,630,810 B2
(45) Date of Patent: *Dec. 8, 2009

(54) ELECTRONICALLY SERVO-ASSISTED BICYCLE GEARSHIFT AND RELATED METHOD

(75) Inventor: Gianfranco Guderzo, Arzignano (IT)

(73) Assignee: Campagnolo S.r.l., Vicenza (IT)

( * ) Notice: Subject to any disclaimer, the term of this patent is extended or adjusted under 35 U.S.C. 154(b) by 0 days.

This patent is subject to a terminal disclaimer.

(21) Appl. No.: 11/933,524

(22) Filed: Nov. 1, 2007

(65) Prior Publication Data

US 2008/0133096 A1 Jun. 5, 2008

Related U.S. Application Data

(60) Continuation of application No. 11/711,221, filed on Feb. 27, 2007, now Pat. No. 7,292,923, which is a division of application No. 10/839,544, filed on May 5, 2004, now Pat. No. 7,184,872.

(30) Foreign Application Priority Data

May 5, 2003  (EP)  .................................. 03425287

(51) Int. Cl.
*G06F 7/00* (2006.01)
*B62M 25/00* (2006.01)
(52) U.S. Cl. .......................... 701/51; 474/116; 74/89.21
(58) Field of Classification Search ............... 701/51, 701/52, 57; 477/70, 116; 74/502.2, 89.21; 474/116

See application file for complete search history.

(56) References Cited

U.S. PATENT DOCUMENTS 4,143,557 A * 3/1979 Wakebe et al. ............... 474/80

| 4,294,341 A | * | 10/1981 | Swart ........................... 477/78 |
| 4,490,127 A | | 12/1984 | Matsumoto et al. |
| 4,605,240 A | | 8/1986 | Clem et al. |
| 4,938,733 A | | 7/1990 | Patterson |
| 4,952,196 A | | 8/1990 | Chilcote et al. |
| 4,976,435 A | | 12/1990 | Shatford et al. |
| 5,213,005 A | | 5/1993 | Nagano |
| 5,213,548 A | | 5/1993 | Colbert et al. |
| 5,357,177 A | | 10/1994 | Fey et al. |
| 5,470,277 A | | 11/1995 | Romano |
| 5,480,356 A | | 1/1996 | Campagnolo |
| 5,577,969 A | | 11/1996 | Watarai |
| 5,599,244 A | | 2/1997 | Ethington |
| 5,681,234 A | | 10/1997 | Ethington |

(Continued)

FOREIGN PATENT DOCUMENTS

DE      3938454      11/1989

(Continued)

*Primary Examiner*—Yonel Beaulieu
(74) *Attorney, Agent, or Firm*—Volpe and Koenig, PC

(57) ABSTRACT

An electronically servo-assisted bicycle gearshift and method for electronically shifting the gears of a bicycle involves the steps of: receiving a signal requesting a displacement of a chain of a bicycle gearshift from a first sprocket to a second adjacent sprocket of a gearshift group comprising at least two sprockets; if the first sprocket has a smaller diameter than the second sprocket, obtaining an upwards gear-shifting position for the second sprocket, if the first sprocket has a larger diameter than the second sprocket, obtaining a downwards gear-shifting position for the second sprocket; and driving an actuator of the gearshift group to displace a guide element of the chain in an axial direction with respect to the gearshift group from the first sprocket to the upwards gear-shifting position for the second sprocket or to the downwards gear-shifting position for the second sprocket, respectively.

20 Claims, 11 Drawing Sheets

U.S. PATENT DOCUMENTS

| | | |
|---|---|---|
| 5,728,017 A | 3/1998 | Bellio et al. |
| 5,787,757 A | 8/1998 | Ozaki |
| 5,865,454 A | 2/1999 | Campagnolo |
| 6,047,230 A | 4/2000 | Spencer et al. |
| 6,146,297 A | 11/2000 | Kimura |
| 6,367,833 B1 | 4/2002 | Horiuchi |
| 6,467,786 B2 | 10/2002 | Horiuchi |
| 6,988,739 B2 | 1/2006 | Guderzo et al. |
| 7,159,881 B2 | 1/2007 | Guderzo et al. |
| 7,184,872 B2 | 2/2007 | Guderzo |
| 2001/0027495 A1 | 10/2001 | Campagnolo |
| 2004/0108680 A1 | 6/2004 | Guderzo et al. |
| 2004/0110585 A1 | 6/2004 | Guderzo et al. |

FOREIGN PATENT DOCUMENTS

| | | |
|---|---|---|
| EP | 0529664 A2 | 3/1993 |
| EP | 0529664 A3 | 3/1993 |
| EP | 0605741 | 7/1994 |
| EP | 1103456 A2 | 5/2001 |
| EP | 1103456 A3 | 1/2003 |
| JP | 05254482 | 10/1993 |
| JP | 09249186 | 9/1997 |
| JP | 10159964 | 6/1998 |
| JP | 10511621 | 10/1998 |
| JP | 2001041322 | 2/2001 |
| JP | 2002302090 | 10/2002 |

* cited by examiner

ELECTRONICALLY SERVO-ASSISTED BICYCLE GEARSHIFT AND RELATED METHOD

CROSS REFERENCE TO RELATED APPLICATION

This application is a continuation application of U.S. Pat. No. 7,292,923 issued on Nov. 6, 2007, that is a divisional of U.S. Pat. No. 7,184,872, both of which are incorporated by reference as if fully set forth.

BACKGROUND

The present invention concerns an electronically servo-assisted bicycle gearshift and a method for servo-assisting a bicycle gearshift, as well as a program and an electronic circuit having means for carrying out the method.

An electronically servo-assisted bicycle gearshift generally comprises a rear actuator, a front actuator, a means for generating a signal, an electronic control unit, a rear transducer and a front transducer. The rear actuator and front actuator each have a respective motor for displacing a chain through a guide element in an axial direction with respect to a respective gearshift group. Each gearshift group comprises at least two sprockets or toothed wheels associated with the hub of the rear wheel (the sprockets also being called pinions and the chain guide element also being called rear derailleur or simply gearshift) and, respectively, with the axis of the pedal cranks (the sprockets or toothed wheels also being called crowns or gears and the guide element also being called front derailleur or simply derailleur). The chain displacement between sprockets takes place in a first direction (for example from a sprocket with a smaller diameter to a sprocket with a larger diameter, or "upwards gear-shifting") or in a second direction opposite to the first direction (for example, from a sprocket with a larger diameter to a sprocket with a smaller diameter or "downwards gear-shifting").

The means for generating a signal requests displacement of the chain from a first sprocket to a second adjacent sprocket of the respective gearshift group, such as levers associated with the two handlebar grips of the bicycle. The electronic control unit is connected to the rear actuator and to the front actuator, and operates, in a normal ride operating mode (i.e. wherein the gearshift is controlled manually by the rider or semi-automatically or automatically by the electronic control unit), to receive the displacement request signal and drive the rear or front actuator, respectively, based upon the displacement request signal to displace the chain from a first sprocket to a second adjacent sprocket of the respective gearshift group, based upon logic positions ("logic values") representing the physical positions of the various sprockets.

The rear transducer and the front transducer detects the position of the actuators (and therefore of the chain guide elements) and indicates the position to the electronic control unit so that the actuators are stopped when the desired position has been reached.

Electronically servo-assisted bicycle gearshifts are described in U.S. Pat. Nos. 5,480,356; 5,470,277; 5,865,454; and EP 1 103 456, all of which are assigned to Campagnolo S.r.l. and U.S. Pat. No. 6,047,230 and German patent application DE 39 38 454 A1.

In particular, EP 1 103 456 describes a gearshift comprising position transducers of the absolute type, capable of providing an electrical signal indicating the absolute position of the derailleurs. When switched on, such transducers take into account the actual position of the derailleurs, which could be slightly displaced due, for example, to vibrations caused by the travel of the bicycle.

In normal operation, in order to assist a gear-shifting from a first sprocket to a second adjacent sprocket, sometimes it is not sufficient to displace the chain guide element (gearshift or derailleur) up to the second sprocket. In fact, due to the existing distance between the guide element and the second sprocket that the chain must engage, and due to the fact that the chain is at an angle during the gear-shifting, such a movement may interfere with the engagement of the chain on the second sprocket. This is a serious problem when shifting gears.

The problem is particularly serious in the case of the front gearshift, where the chain is taut. To shift gears, in particular during an upwards gear-shifting, the rear actuator or front actuator, respectively, must be displaced to a position typically beyond the position corresponding to the second sprocket. Such a displacement in advanced position with respect to the second sprocket promotes the release of the chain from engagement with the first sprocket and the engagement of the chain on the second sprocket.

In mechanical control gearshifts, a control mechanism acts as an actuator to displace the chain guide element. The control mechanism comprises a steel cable slidably contained in a sheath ("Bowden cable") between a manual actuation lever and the chain guide element. The actuation of the lever in a first direction applies a traction on the chain guide element through the steel cable, whereas the actuation of the lever in a second opposite direction applies a thrust on the chain guide element through the steel cable, or lets the cable and the chain guide element free to be returned by a return spring.

To make gear-shifting easier, some mechanical control gearshifts use a control system in which the actuation of the control lever causes the steel cable to move by such a length that the chain guide element moves further than necessary to reach the position of the adjacent sprocket. When the control lever is released, the return spring acts to take the steel cable—and thus the chain guide element—back to the position corresponding to the second sprocket. In other words, the actuation of the control lever causes a temporary displacement of the chain guide element greater than the pitch between two adjacent sprockets of the gearshift group by a certain amount indicated hereafter as "overstroke."

Such a mechanical control gearshift unfortunately has some drawbacks. First, it requires periodic and precise mechanical adjustment of both the steel cable and the return spring tension. Second, it is possible to adjust the amount of the overstroke to only a single value, which impacts as much in all of the upwards gear-shiftings as in all of the downwards gear-shiftings. Consequently, when the amount of the overstroke in a gearshift group is adjusted for optimal gear-shifting in one direction (for example for upwards gear-shifting), a gear-shifting in the opposite direction (in the example, downwards gear-shifting) is unsatisfactory. Alternatively it is necessary to adjust the amount of the overstroke to an intermediate compromise value, obtaining sufficient but not optimal results in gear-shiftings in both directions.

In the case of the front gearshift group, upwards gear-shifting to the outermost sprocket (the sprocket with the largest diameter) is difficult. In this case even the provision of the overstroke may not be sufficient to ensure that the chain engages correctly. Particularly experienced riders could avoid this by keeping the front derailleur at the overstroke position for a certain amount of time (by holding the control lever pressed). The time spent in overstroke position could however be only determined "by ear" and/or "by sight" by the rider, with the result that it could be too brief to give the desired result or so long as to cause harmful stresses to the mechanics of the gearshift or even the arrangement of the chain in positions such as to cause dangerous falls.

SUMMARY

The present invention seeks to overcome these problems using an electronically servo-assisted bicycle gearshift and a method for servo-assisting a bicycle gearshift, as well as a program and an electronic circuit having means for carrying out the method. The object of the invention is to provide an electronically servo-assisted gearshift that allows optimal gear-shifting in both directions, up and down, and between any pair of sprockets.

Specifically, the invention is a method for electronically servo-assisting an electronically servo-assisted bicycle gearshift (8), comprising the steps of:

a) receiving (101, 102) a signal requesting a displacement of a chain (13) of a bicycle gearshift (8) from a first sprocket (11, 12) to a second adjacent sprocket (11, 12) of a gearshift group (9, 10) comprising at least two sprockets, b1) if (101) the first sprocket has a smaller diameter than the second sprocket, obtaining (103) an upwards gear-shifting position for the second sprocket, b2) if (102) the first sprocket has a larger diameter than the second sprocket, obtaining (104) a downwards gear-shifting position for the second sprocket, and c) driving (109, 110) an actuator (16, 17) of the gearshift group (9, 10) to displace a guide element (14, 15) of the chain (13) in an axial direction with respect to the gearshift group (9, 10) from the first sprocket to the upwards gear-shifting position for the second sprocket or to the downwards gear-shifting position for the second sprocket, respectively.

BRIEF DESCRIPTION OF THE DRAWING(S)

DETAILED DESCRIPTION OF THE PREFERRED EMBODIMENT(S)

Figure 1:
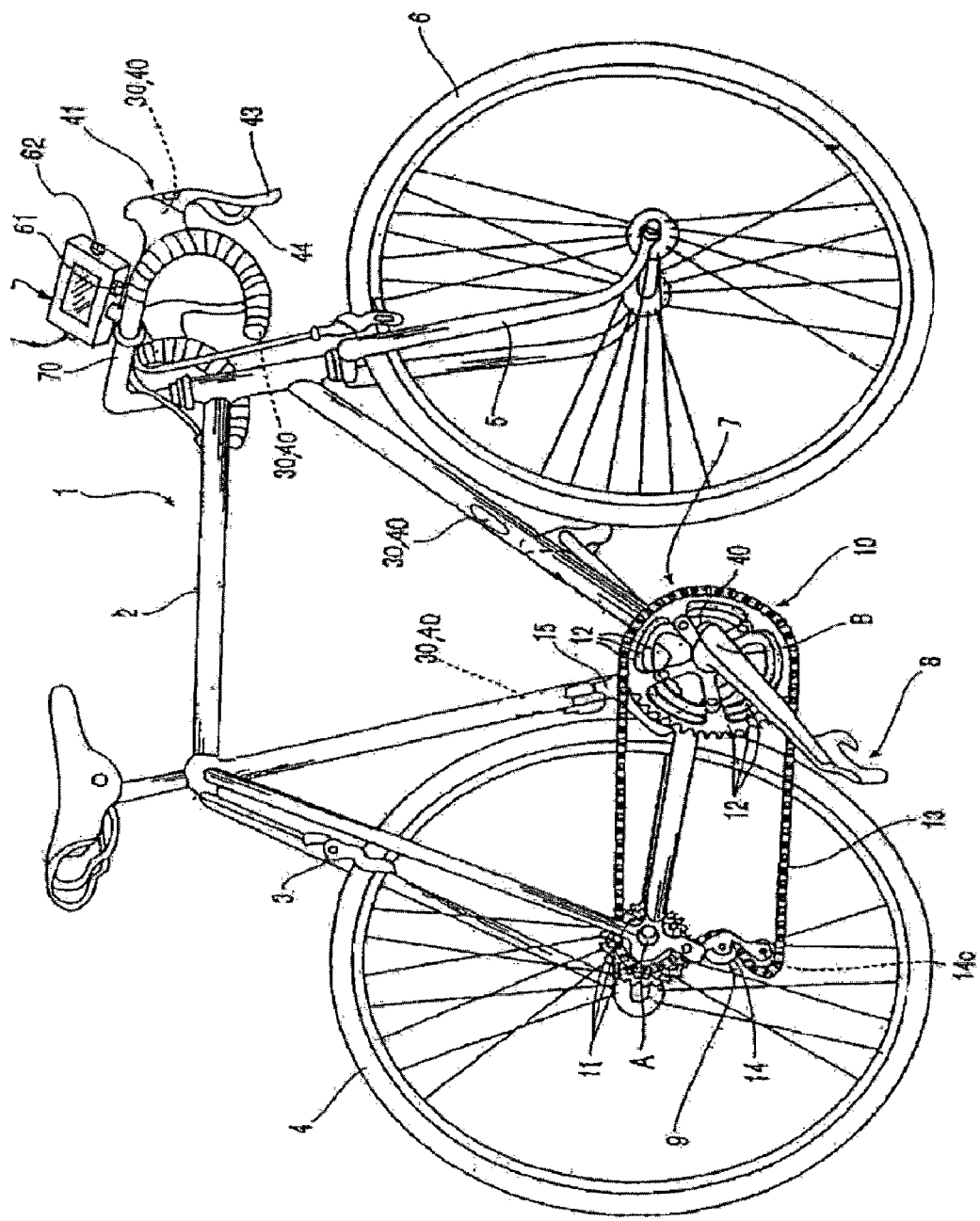
FIG. 1 shows a perspective view of a bicycle equipped with an electronically servo-assisted gearshift.

With reference to FIG. 1, a bicycle 1, in particular a racing bicycle, includes a frame 2 that defines a support structure 3 for a rear wheel 4 and a fork 5 for a front wheel 6. A handlebar 70 is operatively connected to the fork 5.

The frame 2, at its lower portion, supports an axle of the pedal cranks or pedal unit 7, of the conventional type, to actuate the rear wheel 4 through an electronically servo-assisted gearshift 8. The gearshift 8 is substantially formed from a rear gearshift group 9 and a front gearshift group 10.

The rear gearshift group 9 includes a plurality of toothed wheels or sprockets or pinions 11 (FIG. 1 shows ten sprockets, but any number is possible, commonly nine or eleven) having different diameters and coaxial (axis A) with the rear wheel 4. The front gearshift group 10 includes a plurality of toothed wheels or sprockets or crowns or gears 12 (three in the illustrated example, but any number is possible, commonly two) that have different diameters and are coaxial (axis B) with the axle of the pedal cranks 7.

A looped transmission chain 13 selectively engages the sprockets 11 of the rear gearshift group 9 and the sprockets 12 of the front gearshift group 10, to provide the different available gear ratios through the electronically servo-assisted gearshift 8. The different gear ratios can be obtained by moving a chain guide element or rear derailleur (or also simply gearshift) 14 of the rear gearshift group 9 and/or a chain guide element or front derailleur (or also simply derailleur) 15 of the front gearshift group 10.

Figure 2:
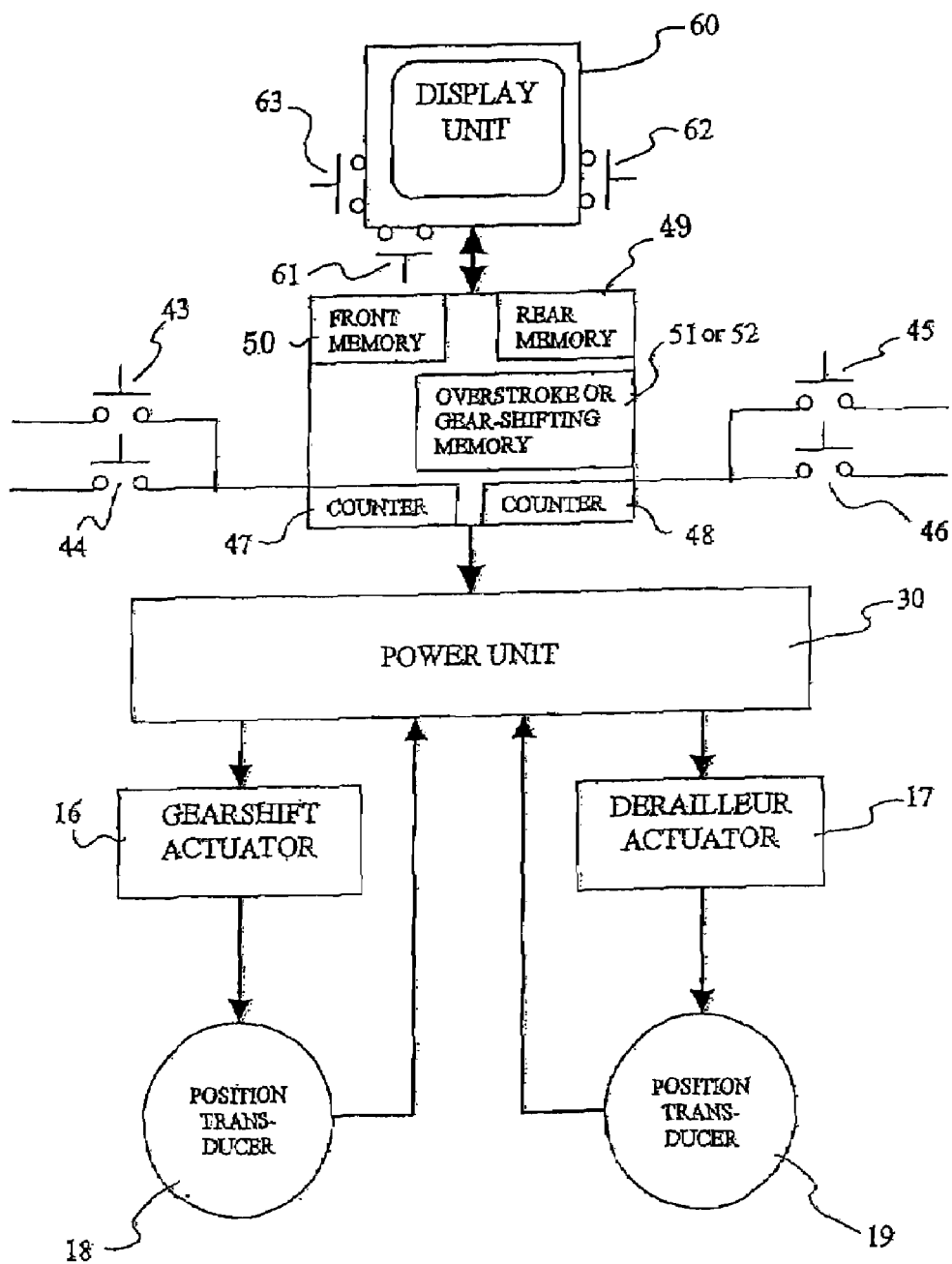
FIG. 2 shows a block diagram of the electronically servo-assisted gearshift.

The rear derailleur 14 and the front derailleur 15 are controlled by a respective actuator 16, 17 (FIG. 2) typically comprising an articulated parallelogram mechanism and an electric motor with reducer to deform the articulated parallelogram.

A position sensor of the rear derailleur or rear transducer 18 and a position sensor of the front derailleur or front transducer 19 (FIG. 2) are associated with the actuators 16, 17. The details of the construction of the derailleurs 14, 15, of the respective actuators 16, 17 and of the respective position sensors or transducers 18, 19 are not illustrated. Details of these can be found in the aforementioned published patent applications and patents. In particular, the transducers 18, 19 are preferably of the type described in EP 1 103 456 A2, suitable for providing an electrical signal indicating the absolute position of the derailleurs 14, 15.

An electronic power board 30, equipped with a battery, provides the electrical power to the motors of the actuators 16, 17, to the transducers 18, 19, to a microprocessors electronic control unit 40 and preferably to a display unit 60. The battery is preferably of the rechargeable type and the rear derailleur 14 can include, in a per se known way, a dynamo-electric unit for recharging the battery.

In the present description and in the attached claims, an electronic control unit 40 is a logic unit that can however be formed of many physical units, in particular of one or more distributed microprocessors which can be held in the display unit 60 and/or in the electronic power board 30 and/or in a command unit. While the program described herein is preferably embodied in at least one microcontroller, alternatively it can be stored in a computer memory or embodied in a read-only memory.

The electronic control unit 40 comprises, besides the microprocessor(s), a memory means that comprises one or more device(s) with several functions: 1) storing the instructions that encode the management program of the electronic gearshift; 2) temporary storing of service variables to carry out the program itself (registers); 3) volatile, non-volatile or permanent storing of some values specified later in the description. Regarding these values, the memory means are distinct in rear memory means, front memory means, overstroke memory means and gear-shifting memory means. It should be understood that such regions are considered from the functional point of view and do not necessarily correspond to physically distinct storing devices. In other words, one or more physical devices can be used for each of the memory means indicated above or, vice-versa, each of the memory means indicated above can physically be embodied by a respective physical device or by memory locations of one or more physical devices.

The storing devices can be of one or more types among read only, write once, or read/write, random access or sequential access memories, and they can be made in various technologies, such as optical memories, magnetic memories, etc.

The storing device(s) can be contained in the display unit 60 and/or in the electronic power board 30 and/or in the command unit and/or they can be distinct devices.

The display unit 60 is preferably removable from the bicycle 1 and houses at least part of the memory means of the electronic control unit 40. The memory means housed in the display unit 60 stores the values set by the user for various parameters of electronic servo-assisted gearshift 8. This embodiment is particularly advantageous for racing bicycles, where the values set by the user reflect the know-how of the rider and are therefore confidential. Also, it allows the display unit, which is relatively expensive, to be safeguarded.

The electronic power board 30 is, for example, housed in one of the tubes of the handlebar 70, in one of the tubes of the frame 2, for example at a support for a drinking bottle (not illustrated), or in the display unit 60, which is preferably housed centrally on the handlebar 70.

The information transfer between the various components is carried out through electrical cables, advantageously housed inside the tubes of the frame 2, or else in a wireless mode, for example with the Bluetooth protocol.

During travel, the rear and front derailleurs 14, 15 are controlled, through the actuators 16, 17, by the electronic control unit 40 based upon signals requesting a displacement of the chain towards a sprocket adjacent to the one upon which the chain is engaged (upwards and downwards gear-shifting request signals) established by manual command devices, or semi-automatically or automatically by the electronic control unit 40 itself. The manual command devices can, for example, comprise levers 43, 44 associated with the brake lever 41 on a grip of the handlebar 70 for the upwards and downwards gear-shifting signals, respectively, of the rear gearshift group 9, and levers 45, 46 (FIG. 2) associated with the brake lever on the other grip of the handlebar 70 for the upwards or downwards gear-shifting signals of the front gearshift group 10 (the levers 45, 46 are not illustrated in FIG. 1 for the sake of clarity).

As an alternative to the levers 43, 44 (45, 46), two manually operated buttons, or two buttons which can be operated by a swing lever can be provided.

The electronic control unit 40 is also associated with the two transducers 18, 19 to stop the motors of the actuators 16, 17 when the respective derailleur 14 or 15 has reached the desired position, such that the chain can engage the adjacent sprocket 11 or 12 (with a larger or smaller diameter, respectively) to the one that it engaged when the displacement request signal (upwards or downwards gear-shifting request signal, respectively) was generated through the manual command device 43, 44, 45, 46 or by the electronic control unit 40. Such a position is indicated in the present description and in the attached claims as "gear-shifting position." As shall be better explained hereafter, the gear-shifting position for at least one given sprocket 11, 12 of a gearshift group 9, 10 is preferably different according to whether the gear-shifting is upwards or downwards and more preferably the upwards and downwards gear-shifting positions are asymmetrically distant from the theoretical position of the sprocket.

In an alternative embodiment, the motors of the actuators 16, 17 are stepper motors which are driven by an appropriate number of steps for each upwards or downwards gear-shifting and then automatically stopped, whereas the transducers 18, 19 are used to provide a feedback signal to the electronic control unit 40 so that it can possibly provide to actuate once again the motors of the actuators 16, 17 in case the gear-shifting position has not been reached. This can, for example, be due to the fact that the resisting torque offered by the derailleur 14, 15, to some degree dependent upon how the rider is pedaling, was too high, greater than the maximum torque which can be delivered by the stepper motors.

More specifically, the electronic control unit 40 comprises a rear counter 47 and a front counter 48. The counters 47, 48 can, for example, each be embodied by a register or a variable stored in a memory cell of the electronic control unit. The electronic control unit 40 in the normal ride operating mode of the gearshift 8, drives the actuators 16, 17 and tracks their position, increasing or decreasing the counters 47, 48, for example by one unit for every step imposed on the stepper motor and/or based upon the reading of the transducers 18, 19.

Figure 4:
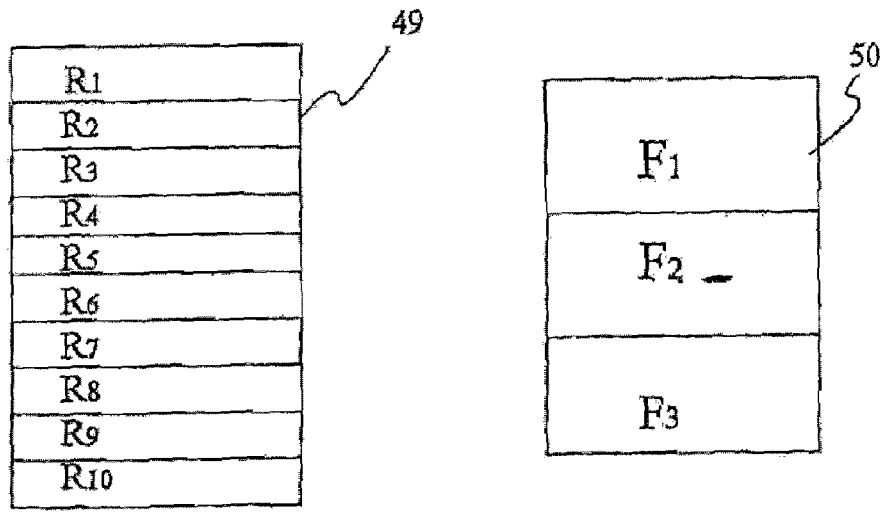
FIGS. 4-6 show different embodiments of front and rear memory means of the gearshift.

According to some embodiments of the electronically servo-assisted gearshift 8, the memory means of the electronic control unit 40 comprise (FIGS. 4-6, described hereafter) rear memory means 49 for the theoretical positions of the sprockets 11 of the rear gearshift group 9 and front memory means 50 for the theoretical positions of the sprockets 12 of the front gearshift group 10. The term theoretical positions of the sprockets 11, 12 means the values of the counters 47, 48 when the derailleurs 14, 15 are at the sprockets 11, 12.

In such embodiments of the electronically servo-assisted gearshift 8, the memory means of the electronic control unit 40 also comprise overstroke memory means 51 (FIGS. 7-12, described hereafter) that stores at least one differential amount, indicated as "amount of overstroke." The or each amount of overstroke represents the offset between the theoretical position of the sprocket 11 and/or 12, indicated by the memory means 49 and/or 50, and the position that the guide element 14, 15 must take up during an upwards and/or downwards gear-shifting to assist the gear-shifting itself, i.e. the upwards and/or downwards gear-shifting position defined above.

Figure 3:
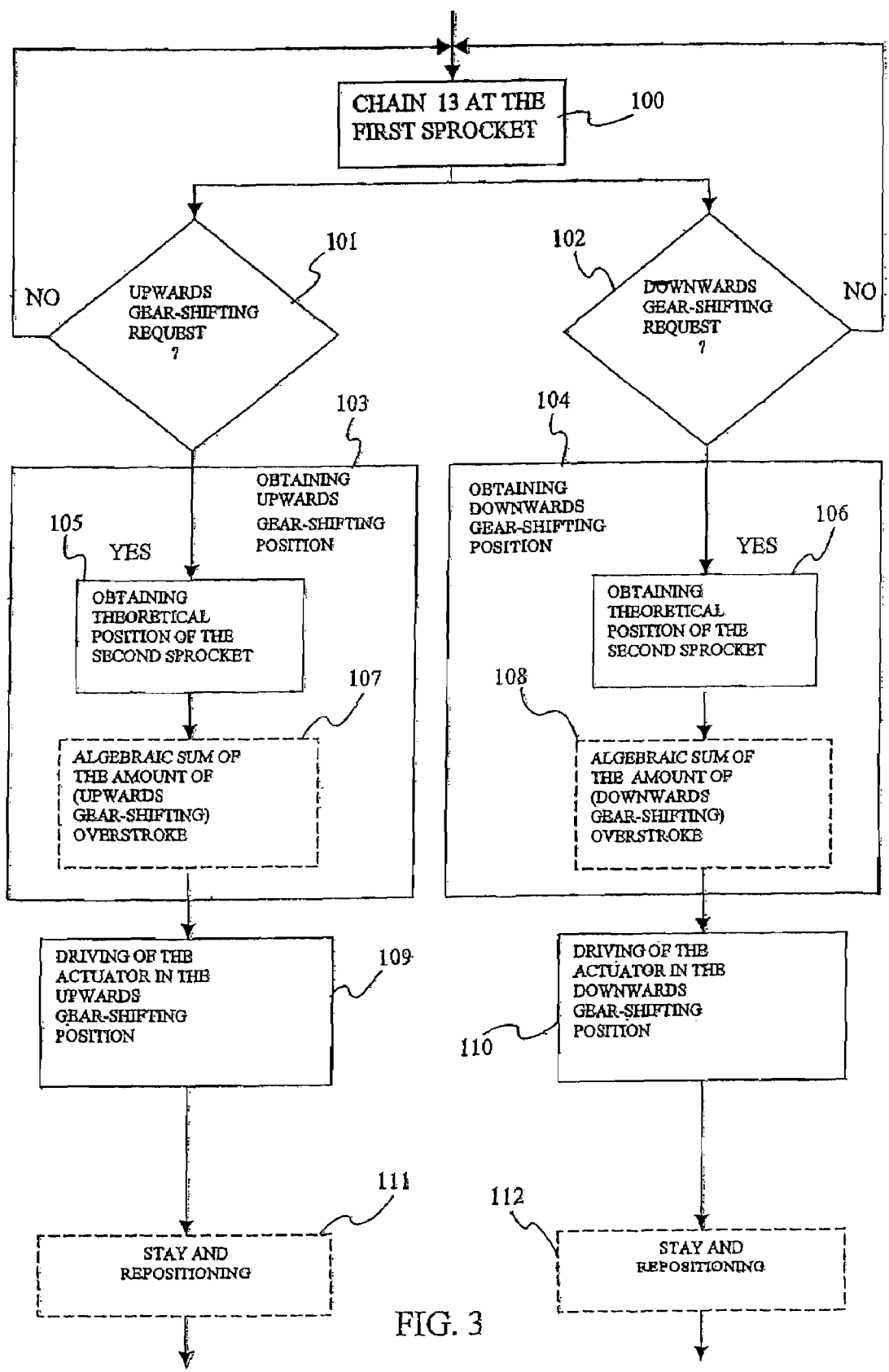
FIG. 3 shows a block diagram of the method for electronically servo-assisting an electronically servo-assisted gearshift.

The block diagram of FIG. 3 represents a method for electronically servo-assisting the gearshift 8 that generally applies both to the rear gearshift group 9 and to the front gearshift group 10. If the chain 13 is at a first sprocket 11 (12), block 100, and the counter 47 (48) has a first logic value, when the rider actuates the manual upwards gear-shifting request command 43 (45), block 101, or respectively, the manual downwards gear-shifting request control 44 (46), block 102 (or when such a request is generated by the electronic control unit 40 itself), the electronic control unit 40 firstly provides for obtaining the gear-shifting position for the second sprocket 11 (12), block 103 or 104 respectively, that shall be an upwards gear-shifting position, if the first sprocket has a smaller diameter than the second sprocket (block 103), and a downwards gear-shifting position, if the first sprocket has a larger diameter than the second sprocket (block 104). As mentioned, the downwards gear-shifting position is preferably different from the upwards gear-shifting position at least for one second sprocket, and preferably such positions are asymmetrically distant from the theoretical position of the second sprocket.

Once the upwards gear-shifting position (block 103) or the downwards gear-shifting position (block 104), respectively, has been obtained, the electronic control unit 40 takes care of driving, block 109 or 110, respectively, the actuator 16 (17) to displace the chain along the axis A (B) in a first direction which goes from the first sprocket to the second sprocket until the counter 47 (48) reaches the value indicated by the upwards gear-shifting position or by the downwards gear-shifting position, respectively.

In case the actuators 16, 17 comprise stepper motors, advantageously a movement of one step or an integer multiple of steps of the stepper motor, in a first or second direction of rotation, corresponds to each unitary increase or decrease of the counter 47, 48. Following the driving step, the electronic control unit 40 can optionally take care of carrying out a stay and repositioning step, schematically indicated by the dashed blocks 111 and 112 in FIG. 3 and better described hereafter with reference to FIGS. 16-19. Such a step comprises driving the actuator 16 (17) to displace the chain along the axis A (B) in the first direction or in a second direction opposite to the first direction until the counter 47 (48) reaches the theoretical position of the second sprocket 11 (12), read directly from the memory means 49 (50) or derived from the information read from the memory means 49 (50).

In these embodiments, the step of obtaining the upwards gear-shifting position (block 103), or respectively the downwards gear-shifting position (block 104), is carried out through the steps of:

obtaining, block 105 or 106, respectively, the theoretical position of the second sprocket 11 (12) from the rear 49 (front 50) memory means, reading it directly from the memory means 49 (50) or deriving it from the information read from the memory means 49 (50), as better specified hereafter;

where provided for, as better specified hereafter, algebraically adding (block 107 and/or 108) the suitable amount of overstroke, stored in the overstroke memory means 51, to the theoretical position of the second sprocket 11 (12).

In a first embodiment (FIG. 4), the rear and front memory means 49 and 50 are suitable for directly storing a value associated with each sprocket 11, 12 of the respective gearshift group 9, 10, representing the physical position of the sprocket 11, 12 in the respective gearshift group. Thus, in the exemplifying case of rear gearshift group 9 comprising ten sprockets or pinions 11, the rear memory means 49 are suitable for storing several logic values: 1) a logic value R1 associated with the wheel with the smallest diameter, 2) a logic value R2 associated with the sprocket immediately adjacent to it, with a slightly larger diameter, 3) a logic value R3 associated with the sprocket immediately adjacent to it, with a yet larger diameter etc., up to a logic value -R10- associated with the sprocket with the largest diameter. For a front gearshift group 10 comprising three sprockets or crowns 12, the front memory means 50 are suitable for storing a logic value F1 associated with the wheel with the smallest diameter, a logic value F2 associated with the sprocket with an intermediate diameter and a logic value F3 associated with the sprocket with the largest diameter.

In such an embodiment, the electronic control unit 40 obtains, in block 105 or 106, the theoretical position of the second sprocket 11, 12 by reading the value associated with it directly from the memory 49, 50.

In a second embodiment (FIG. 5), the rear memory means 49 are suitable for storing a differential amount associated with each pair of adjacent sprockets 11. Thus, in the exemplifying case of rear gearshift group 9 comprising ten sprockets or pinions 11, the rear memory means 49 are suitable for storing a differential amount $\Delta R1\text{-}2$ associated with the pair consisting of the sprocket 11 with the smallest diameter and the sprocket 11 immediately adjacent to it (with a slightly larger diameter), a differential amount $\Delta R2\text{-}3$ associated with the pair consisting of this latter sprocket and that one adjacent to it, etc., up to a differential amount $\Delta R9\text{-}10$ associated with the pair of sprockets 11 having the largest diameters; in the exemplifying case of front gearshift group 10 comprising three sprockets or crowns 12, the front memory means 50 are suitable for storing two differential amount $\Delta F1\text{-}2$ and $\Delta F2\text{-}3$. If the theoretical position of the sprocket with the smallest diameter does not correspond to the zero value of the counter 47, 48, the front and rear memory means 49, 50 are also suitable for storing such a theoretical position R1, F1.

In such an embodiment, the electronic control unit 40 obtains, in block 105 (or in block 106 respectively), the theoretical position of the second sprocket 11, 12 by adding (or subtracting) the differential amount corresponding to the pair consisting of the first sprocket 11, 12 and the second sprocket 11, 12 with immediately larger (smaller) diameter stored in the front and rear memory means 49, 50 to (or from) the current value of the counter when the chain 13 is at the first sprocket, block 100.

As an alternative to the use of the current value of the counter at block 100, in particular when the stay and repositioning step 111 (112) is absent, the electronic control unit 40 obtains, in block 105 (or in block 106, respectively), the theoretical position of the second sprocket 11, 12 by adding up the differential amount associated with the pair of sprockets formed by the second sprocket and the adjacent sprocket with a smaller diameter (which is the first sprocket in the case of an upwards gear-shifting), all of the possible differential amounts associated with the pairs of sprockets with smaller diameters and the value associated with the sprocket with the smallest diameter, if provided for.

In a third embodiment, which can be implemented when the gearshift groups 9, 10 comprise sprockets 11, 12 equally spaced by a certain pitch, the rear 49 and front memory means 50 (FIG. 6) store a single differential amount $\Delta R$ and $\Delta F$. If the pitch between adjacent sprockets 11 of the rear gearshift group 9 is equal to the pitch between adjacent sprockets 12 of the front gearshift group 10, there can be only a single memory means, for example just the front memory 49. If the theoretical position of the sprocket with the smallest diameter does not correspond to the zero value of the counter 47, 48, the front and rear memory means 49, 50 are also suitable for storing such a theoretical position R1, F1. In such an embodiment, the electronic control unit 40 obtains, in block 105 (or in block 106, respectively), the theoretical position of the second sprocket 11, 12 by adding (or subtracting) the differential amount $\Delta R$ or $\Delta F$ to or from the current value of the counter when the chain 13 is at the first sprocket, block 100.

Alternatively, the electronic control unit 40 obtains the theoretical position of the second sprocket 11, 12 from the product of the differential amount $\Delta R$ or $\Delta F$ times the number (j−1 if the second sprocket is the jth of the gearshift group) of pairs of sprockets comprised of the pair of sprockets formed by the second sprocket and by the adjacent sprocket with a smaller diameter (which is the first sprocket in the case of an upwards gear-shifting) and all of the possible differential amounts associated with the pairs of sprockets with smaller diameters and adding to this, if provided for, the value associated with the sprocket with the smallest diameter. (again, this assumes that each sprocket is axially equidistant from its adjacent sprockets.)

Irrespectively of the embodiment of the front and rear memory means 49, 50, various embodiments of the overstroke memory means 51 are possible.

According to a first embodiment (FIG. 7) just one value of overstroke E is provided for, generally represented by a relative number. The electronic control unit 40 can use the single amount of overstroke E in various ways according to the block diagram of FIG. 3. In a first preferred way, such an amount of overstroke E is algebraically added in the case of an upwards gear-shifting, block 107, to the theoretical position of the second sprocket obtained in block 105 in the ways defined above, whereas block 108 is absent; in such a case the amount of overstroke E is typically represented by a positive number.

In a second way, such an amount of overstroke E is algebraically added in the case of a downwards gear-shifting, block 108, to the theoretical position of the second sprocket obtained in block 106, whereas block 107 is absent; in such a case the amount of overstroke E is typically represented by a negative number so that its absolute value is subtracted from the theoretical position of the second sprocket.

In a third way, such an amount of overstroke E is algebraically added in the case of an upwards gear-shifting, block 107, to the theoretical position of the second sprocket obtained in block 106, whereas in the case of a downwards gear-shifting, block 108, its opposite (where –X indicates the opposite of X) is algebraically added to the theoretical position of the second sprocket obtained in block 106. In such a case the amount of overstroke E is typically represented by a positive number.

It should be noted that the amount of overstroke E, as well as the theoretical position of the second sprocket 11, 12 stored directly or indirectly in the rear and front memory means 49, 50 and obtained in block 105 or 106, shall have suitable values according to the way of use by the electronic control unit 40; typically, in the second and third ways the theoretical position of the second sprocket can be corrected with respect to the physical position of the sprocket itself.

Since the chain 13 is taut at the guide element 15 of the front gearshift group 10, but not taut at the guide element 14 of the rear gearshift group 9, to make the electronically servo-assisted gearshift 8 and the method for servo-assisting it particularly simple, it can be sufficient to provide for the algebraic adding steps 107, 108, and more particularly just the algebraic adding step 107 in the case of an upwards gear-shifting, only for the front gearshift group 10 or even only in the case of the gear-shifting towards the sprocket 12 with the largest diameter of the front gearshift group 10.

According to a second embodiment (FIG. 8), the overstroke memory means 51 are suitable for storing an amount E+ of overstroke for an upwards gear-shifting and an amount E− of overstroke for a downwards gear-shifting, in general represented by relative numbers. More typically, the amount E+ of overstroke for an upwards gear-shifting is represented by a positive number and the amount of overstroke E− for a downwards gear-shifting is represented by a negative number. In the case of an upwards gear-shifting, the electronic control unit 40, in block 107 of FIG. 3, algebraically adds the amount of overstroke E+ for an upwards gear-shifting to the theoretical position of the second sprocket 11, 12 obtained in the step represented by block 105. In the case of a downwards gear-shifting, the electronic control unit 40, in block 108, algebraically adds the amount of overstroke E− for a downwards gear-shifting to the theoretical position of the second sprocket 11, 12 obtained in the step represented by block 106. Also in the second embodiment, to simplify the electronically servo-assisted gearshift 8 and the method for servo-assisting, it may be sufficient to provide for the algebraic adding steps 107, 108 only for the front gearshift group 10.

Figure 7:
FIGS. 7-12 show different embodiments of overstroke memory means of the gearshift.
Figure 8:
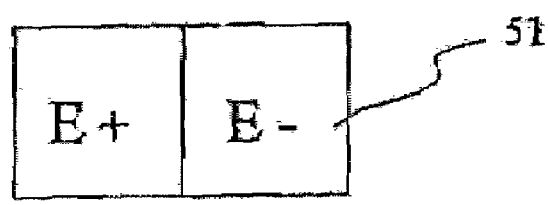
Figure 9:
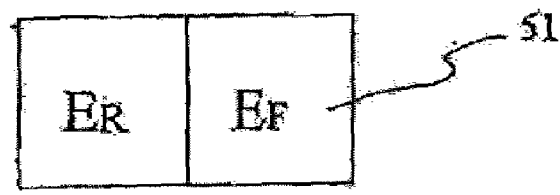
Figure 10:
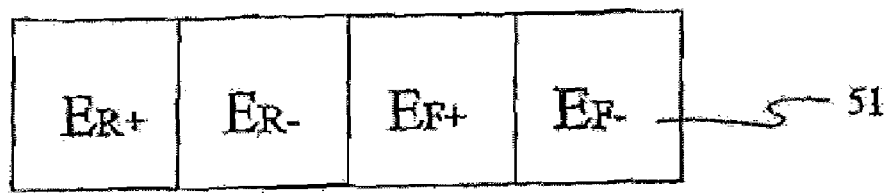
Figure 11:
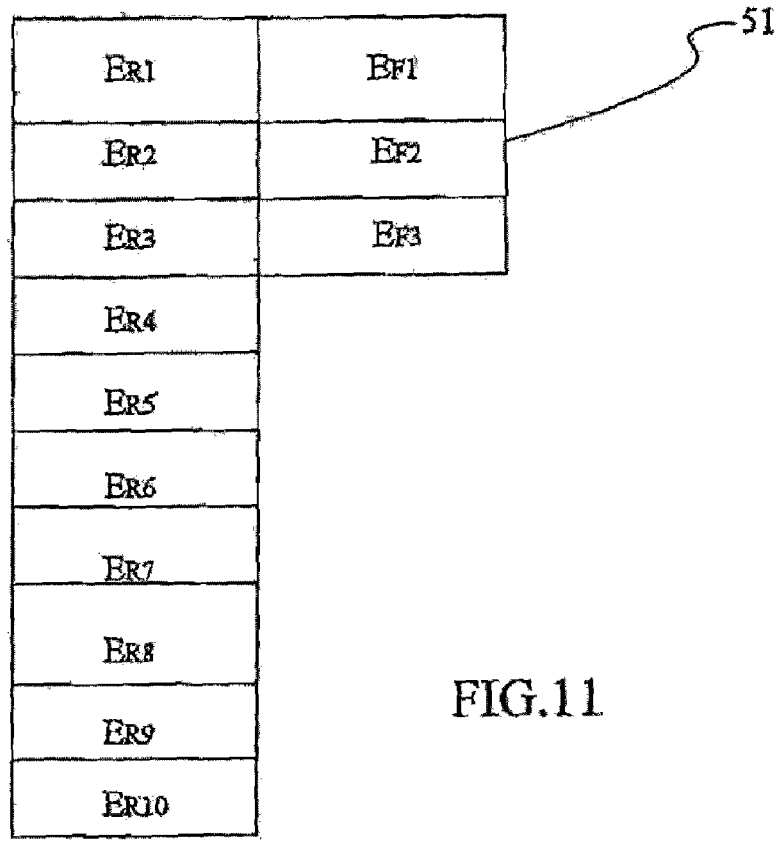
Figure 12:
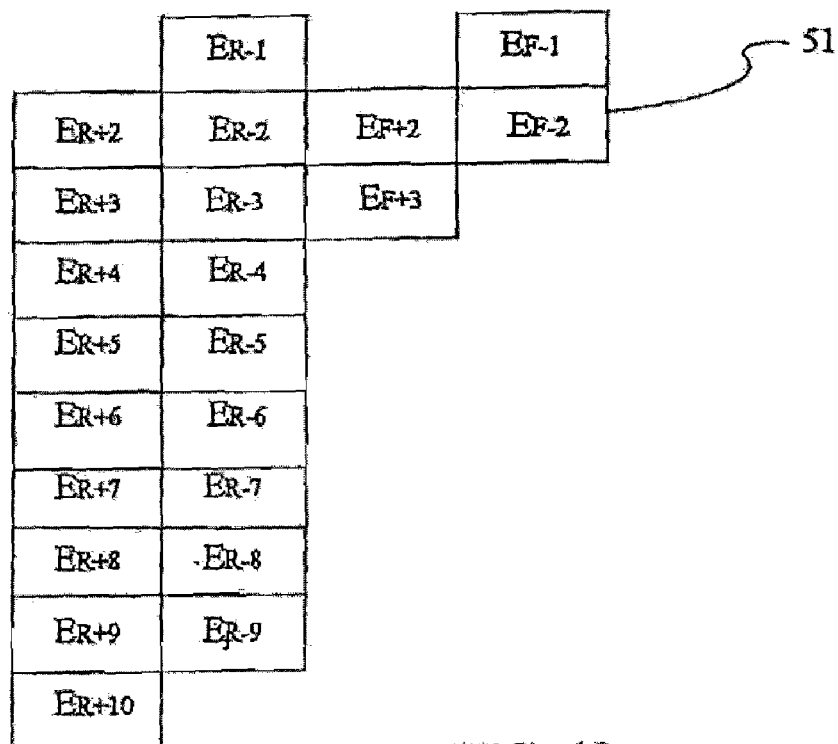

In a third embodiment, (FIG. 9), the overstroke memory means 51 are suitable for storing a single amount of overstroke ER for the rear gearshift group 9 and a single amount of overstroke EF for the front gearshift group 10, each independently used by the electronic control unit 40 in one of the three ways outlined above with reference to the embodiment of FIG. 7 and to which the other considerations outlined with reference to such a FIG. 7 apply. This is advantageous because the tension of the chain 13 is different at the guide elements 14, 15 of the rear and front gearshift groups 9 and 10, because the pitch between adjacent sprockets 11, 12 of the rear gearshift group 9 can be different from the pitch between adjacent sprockets 12 of the front gearshift group 10, and because the distance between the guide element 14, 15 of the chain 13 and the sprockets 11, 12 is different in the case of the two gearshift groups, front 9 and rear 10. For the above reasons, it may be suitable to differentiate the values of overstroke to be applied to the rear gearshift group 9 and to the front gearshift group 10 as obtained by the third embodiment.

In a fourth embodiment (FIG. 10), the overstroke means 51 are suitable for storing, for the rear gearshift group 9, an amount ER+ of overstroke for an upwards gear-shifting and an amount ER− of overstroke for a downwards gear-shifting and, for the front gearshift group 10, an amount EF+ of overstroke for an upwards gear-shifting and an amount EF− of overstroke for a downwards gear-shifting, to be used in the way described above with reference to the embodiment of FIG. 8.

The amounts of overstroke according to this fourth embodiment ER+, ER−, EF+, EF− are also generally represented by relative numbers, but typically the amounts ER+, EF+ are represented by positive numbers so that their absolute value is added to the theoretical position of the second sprocket 11, 12, whereas the amounts ER−, EF− are represented by negative numbers so that their absolute value is subtracted from the theoretical position of the second sprocket 11, 12. This is because, to assist the gear-shifting from a first sprocket to a second sprocket, it turns out to be suitable to displace the chain guide element 14, 15 in a gear-shifting position far from the first sprocket beyond the second sprocket.

According to a fifth embodiment, the overstroke memory means (FIG. 11) store an amount ERj of overstroke for each sprocket of the rear gearshift group 9 and an amount EFj of overstroke for each sprocket of the front gearshift group 10. The amounts of overstroke ERj, EFj can be managed by the electronic control unit 40 in block 107 and/or in block 108 in the three ways described above with reference to the embodiment of FIG. 7. If the first way is used, in which in the case of an upwards gear-shifting the amount of overstroke ERj or EFj associated with the second sprocket is algebraically added, in particular added in an absolute value, to the theoretical position of the second sprocket, whereas block 108 is absent, no amount of overstroke associated with the sprocket with the smallest diameter shall be provided for; if the second way is used, in which in the case of a downwards gear-shifting the amount of overstroke ERj or EFj associated with the second sprocket is algebraically added, in particular subtracted in an absolute value, to the theoretical position of the second sprocket, whereas block 107 is absent, no amount of overstroke associated with the sprocket with the largest diameter shall be provided for.

According to a sixth embodiment, the overstroke memory means (FIG. 12) store an amount of overstroke for an upwards gear-shifting ER+j, EF+j and an amount of overstroke for a downwards gear-shifting ER−j, EF−j for each intermediate sprocket 11, 12 of each gearshift group 9, 10, as well as an amount of overstroke for an upwards gear-shifting ER+j, EF+j for the sprocket with the largest diameter and an amount of overstroke for a downwards gear-shifting ER−1, EF−1 for the sprocket with the smallest diameter. From another point of view, an amount of overstroke for an upwards gear-shifting and an amount of overstroke for a downwards gear-shifting are stored for each pair of adjacent sprockets of each gearshift group. Thus, in the case of rear gearshift group 9 having ten sprockets 11, eighteen amounts shall be provided for and in the case of front gearshift group 10 comprising three sprockets 12, four amounts shall be provided for.

The electronic control unit 40, in block 107 of FIG. 3, algebraically adds the amount of overstroke ER+j, EF+j for an upwards gear-shifting associated with the second sprocket to the theoretical position of the second sprocket 11, 12; in the case of a downwards gear-shifting, the electronic control unit 40, in block 108, algebraically adds the amount of overstroke ER−j, EF−j for a downwards gear-shifting associated with the second sprocket to the theoretical position of the second sprocket 11, 12.

It is worth highlighting that in all of the embodiments of the overstroke memory means 51 described above, it is possible to choose between the implementation of an adding operation in blocks 107, 108 associated with the storing of relative numbers in the memory means 51, and the implementation of adding operations in block 107 and subtraction operations in block 108 associated with the storing of typically positive, but also relative, numbers in the overstroke memory means 51. The upwards gear-shifting position obtained in block 103 is generally different from the downwards gear-shifting position obtained in block 104, because it is obtained through a different application of a same absolute overstroke value in the aforementioned two blocks, because it is obtained through the application of the or an overstroke value in just one of the aforementioned blocks, or because it is obtained through an analogous application of different overstroke values in the aforementioned two blocks. Even more preferably, the upwards and downwards gear-shifting positions are asymmetrical about the theoretical position of the second sprocket, like in the latter two cases.

According to other embodiments of the electronically servo-assisted gearshift 8, the electronic control unit 40 comprises gear-shifting memory means 52 instead of the overstroke memory means 51.

For example, in a first embodiment (FIG. 13), the gear-shifting memory means 52 also replace the front memory means 49 and the rear memory means 50 and are suitable for directly storing an upwards gear-shifting position R+j, F+j and a downwards gear-shifting position R−j, F−j for each intermediate sprocket 11, 12 of each gearshift group 9, 10, as well as an upwards gear-shifting position R+j, F+j for the sprocket with the largest diameter and a downwards gear-shifting position R−1, F−1 for the sprocket with the smallest diameter.

In other words, the gear-shifting memory means 52 are suitable for storing the upwards gear-shifting position towards each sprocket 11, 12, apart from the sprocket with the smallest diameter, and the downwards gear-shifting position towards each sprocket 11, 12, apart from the sprocket with the largest diameter. Therefore, two (different) gear-shifting positions correspond to each non-end sprocket 11, 12 of the rear or front gearshift group 9, 10, according to whether the sprocket 11, 12 is reached during an upwards gear-shifting or during a downwards gear-shifting. One gear-shifting position, upwards or downwards respectively, corresponds to each end sprocket 11, 12 of the gearshift group, i.e. those with the largest and the smallest diameter.

Figures 13, 14, 15:
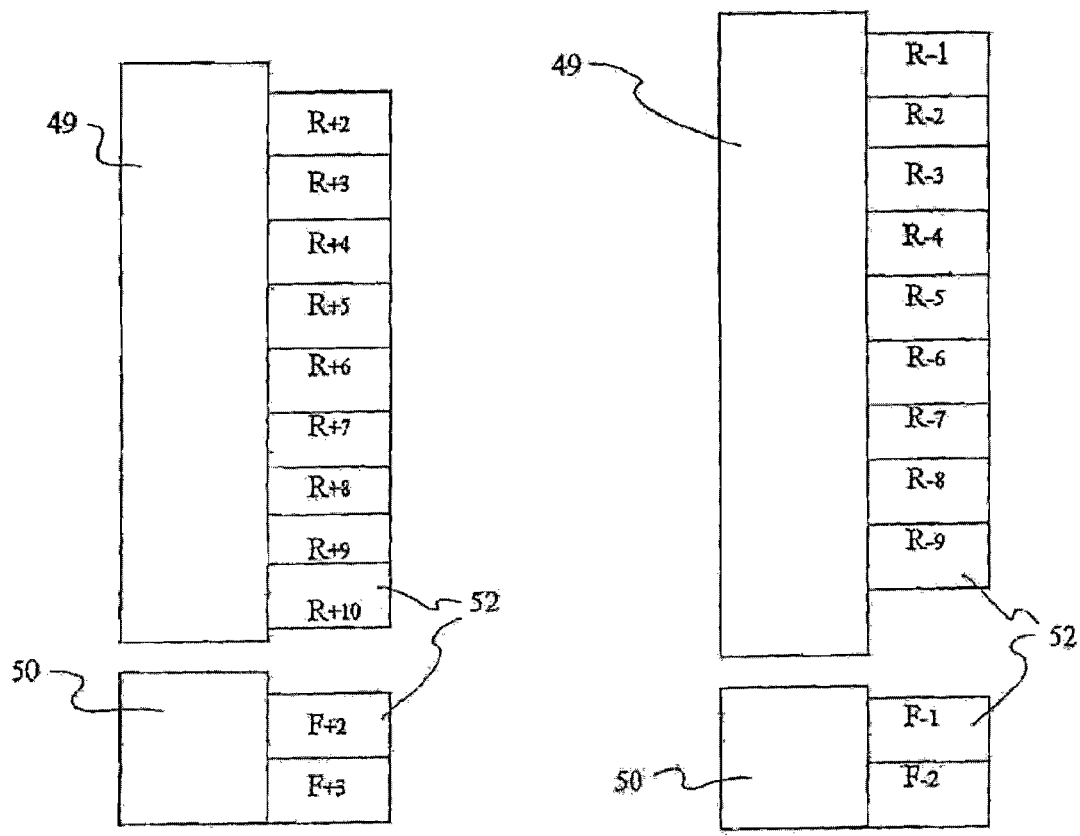
FIGS. 13-15 show different embodiments of gear-shifting memory means of the gearshift.

In FIG. 13, the gear-shifting memory means 52 are suitable for storing the nine upwards gear-shifting positions R+2, R+3, . . . , R+j, . . . , R+10 and the nine downwards gear-shifting positions R−1, R−2, . . . , R−i, . . . , R−9, as well as the two upwards gear-shifting positions F+2, F+3 and the two downwards gear-shifting positions F−1, F−2. (The number of sprockets is not limiting, that is, other numbers of upwards and downwards gear-shifting positions may be suitable, according to the number of sprockets.)

In the method for servo-assisting a gearshift 8 according to this embodiment, in blocks 103 and 104 the electronic control unit 40 obtains the gear-shifting positions, namely the values that the counters 47, 48 must take up so that the derailleurs 14, 15 are in positions such as to allow the engagement of the chain 13 with the sprockets 11, 12 desired from time to time, by reading the suitable value directly from the gear-shifting memory means 52.

Similarly to what stated when dealing with the overstroke memory means 51, the upwards gear-shifting positions, or preferably the downwards gear-shifting positions, could coincide with the theoretical positions of the second sprockets 11, 12 since these positions can cause a sufficient displacement of the chain 13 to obtain the gear-shifting.

In other embodiments of the gearshift 8, the electronic control unit 40 comprises the rear and front memory means 49, 50 in one of the various embodiments described above (FIGS. 4-6) and, in the gear-shifting memory means 52, just the upwards gear-shifting position (FIG. 14) or just the downwards gear-shifting position (FIG. 15), respectively, for each sprocket apart from the sprocket with the smallest or largest diameter, respectively. In such embodiments, the step of obtaining the upwards gear-shifting position (block 103) or the step of obtaining the downwards gear-shifting position (block 104), respectively, shall be carried out by reading the value directly from the gear-shifting memory means 52, whereas the step of obtaining the downwards gear-shifting position (block 104) or the step of obtaining the upwards gear-shifting position (block 103), respectively, shall be carried out through the step, block 106 or block 105 respectively, of obtaining the theoretical position of the second sprocket from the front and rear memory means 49, 50.

Moreover, analogously to what has been indicated with reference to the embodiments providing for the overstroke memory means 51, in embodiments providing for the gear-shifting memory means 52 in combination with the front and rear memory means 49, 50, the upwards and downwards gear-shifting positions, respectively, can be provided for not all of the sprockets, but only for the sprockets in which a gear-shifting position which is different from the theoretical position is necessary. In particular, in the gear-shifting memory means 52 according to the embodiment of FIG. 14, just the upwards gear-shifting position for the sprocket 12 with the largest diameter of the front gearshift group 10 could be provided for.

The embodiments of FIGS. 13-15 have the advantage of requiring little memory and of not requiring algebraic adding operations by the electronic control unit 40. However, to implement the optional step of stay and repositioning illustrated by blocks 111, 112 and described hereafter, it is necessary to provide for the front and rear memory means 49, 50 to store the theoretical positions, which in the case of the embodiment of FIG. 13, reduces the advantage of the little memory required.

Figure 5:
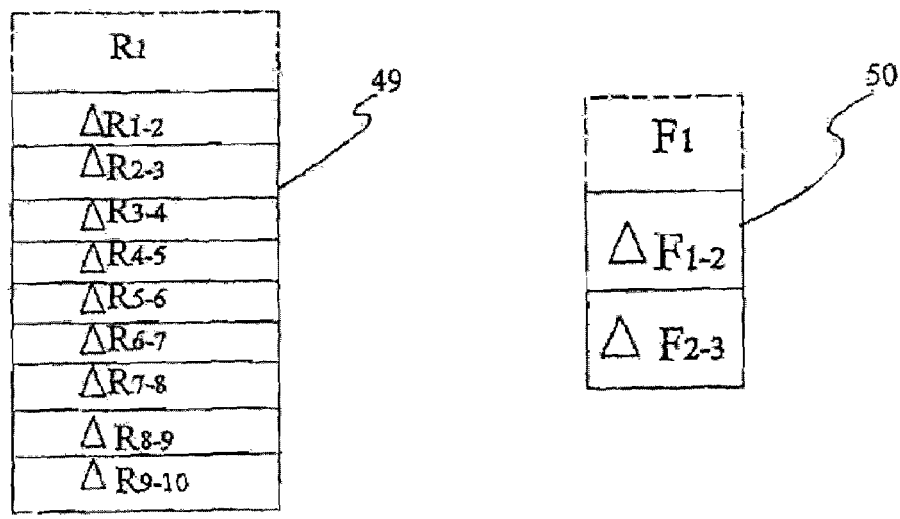
Figure 6:
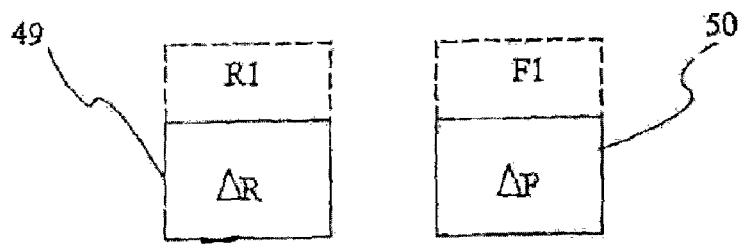

Embodiments in which the gear-shifting positions are stored as differential amounts, analogously to the embodiments of FIGS. 5 and 6, are also possible.

It can easily be understood that, for a specific electronically servo-assisted gearshift 8, the values of the gear-shifting positions stored in the gear-shifting memory means 52 differ from the values of the theoretical positions by an offset that would correspond to the or the respective amount of overstroke in one of the embodiments providing for the overstroke memory means 51. In other words, the values of the gear-shifting positions stored in the gear-shifting memory means 52 in use encompass the amount or amounts of overstroke.

It is possible to use different embodiments of the memory means, and/or different ways of using the amounts of overstroke stored in the overstroke memory means 51, for the rear gearshift group 9 and for the front gearshift group 10.

As mentioned, the method for servo-assisting a bicycle gearshift can provide, after the guide element 14, 15 of the chain 13 has been taken into the gear-shifting position at blocks 109, 110, for an optional step of stay and repositioning, schematically represented by block 111 and/or by block 112 of FIG. 3. In the optional step of stay and repositioning 111, 112, the electronic control unit 40, once a certain period of time has elapsed and/or once an end-of-gear-shifting-request signal has been received, as better explained hereafter, drives (in a step indicated by block 116 in FIGS. 16-19) the actuator 16, 17 to displace the chain 13 until the counter 47, 48 reaches the theoretical position of the second sprocket 11, 12, obtained from the memory means 49, 50 in the ways described above with reference to blocks 105, 106.

It should be understood that the displacement shall take place along the axis A, B in the first direction from the first sprocket to the second sprocket or more typically in the second direction from the second sprocket to the first sprocket according to the amount of overstroke or, in the case of the embodiments of FIGS. 13-15, according to whether the upwards gear-shifting position is smaller or greater than the theoretical position of the second sprocket, or the downwards gear-shifting position is greater or smaller than the theoretical position of the second sprocket.

The advisability of providing for such a step of stay and repositioning 111, 112 consists in that even providing for a gear-shifting position which is different from the theoretical position of the second sprocket (where the difference in position or offset is stored in the overstroke memory means 51 or in any case encompassed in the values of the gear-shifting positions stored in the gear-shifting memory means 52) may not in itself be sufficient to cause the chain 13 to correctly engage with the second sprocket 11, 12.

As mentioned in the Background above, the problem is particularly serious in the case of upwards gear-shifting towards the sprocket 12 with the largest diameter of the front gearshift group 10 (the outermost one). With the mechanical control gearshifts equipped with overstroke described, skilled riders could avoid this by maintaining pressure on the control lever and thus the derailleur 14, 15 at the gear-shifting position for a certain amount of time. The time of stay in gear-shifting position could however only be determined "by ear" and/or "by sight" by the rider, with the result that it could be too brief to give the desired result or so long as to cause harmful stresses to the mechanics of the gearshift or even the arrangement of the chain in positions such as to cause dangerous falls.

Figures 16, 17:
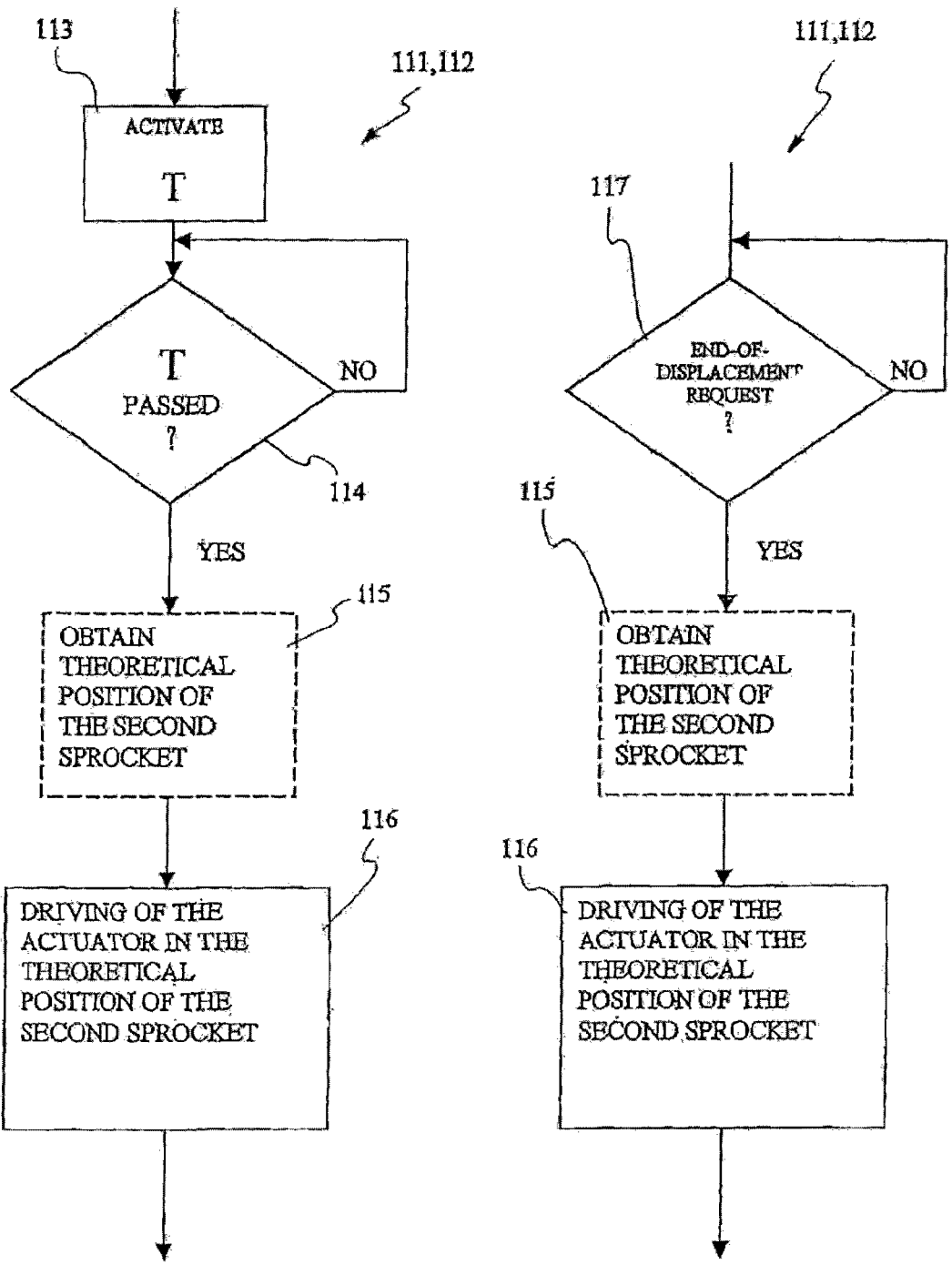
FIGS. 16-19 show different embodiments of an optional step of the method.

In a first embodiment of the step of stay and repositioning 111, 112, illustrated in FIG. 16, the aforementioned step of driving the actuator 16, 17 to displace the guide element 14, 15 of the chain 13 in the theoretical position of the second sprocket 11, 12 (block 116) is subordinated to the passing of a predetermined period of time after the step 109, 110 of driving the actuator 16, 17 to displace the guide element 14, 15 of the chain 13 in the gear-shifting position.

More specifically, the electronic control unit 40 takes care, in block 113, of activating a timer and, in block 114, of monitoring the passing of a predetermined time period T. The timer can, of course, be a count-down or a count-up one and can be implemented by a memory variable managed by the clock signal of a microprocessor of the electronic control unit 40 or by a dedicated device.

When the predetermined time period T has passed, if necessary in a block 115 a step of obtaining the theoretical position of the second sprocket 11, 12 from the information stored in the front and rear memory means 49, 50 is carried out and then, in block 116, the aforementioned step of driving the actuator 16, 17 to displace the chain 13 until the counter 47, 48 reaches the theoretical position of the second sprocket 11, 12 is carried out. It should be understood that the step 115 of obtaining the theoretical position of the second sprocket 11, 12 is indicated as optional since typically it will not be carried out if said theoretical position had already been obtained previously when carrying out the step represented by block 105, 106.

In a second embodiment of the step of stay and repositioning 111, 112, illustrated in FIG. 17, the aforementioned step of driving the actuator 16, 17 to displace the guide element 14, 15 of the chain 13 in the theoretical position of the second sprocket 11, 12 (block 116) is subordinated to the receiving of an end-of-displacement-request signal after the step 109, 110 of driving the actuator 16, 17 to displace the guide element 14, 15 of the chain 13 in the gear-shifting position.

More specifically, the electronic control unit 40 takes care, in block 117, of monitoring the receiving of an end-of-displacement-request signal. In the normal ride operating mode, with automatic or semi-automatic operation, it is the electronic control unit 40 itself that generates said end-of-displacement-request signal. Typically, in the normal ride operating mode with manual control, such a signal is, on the other hand, generated by the release of the gear-shifting request control 43-46 by the rider.

When such a signal has been received, if necessary, in a block 115, the step of obtaining the theoretical position of the second sprocket 11, 12 from the information stored in the front and rear memory means 49, 50 is carried out and then, in block 116, the aforementioned step of driving the actuator 16, 17 to displace the chain 13 until the counter 47, 48 reaches the theoretical position of the second sprocket 11, 12 is carried out.

Figure 18:
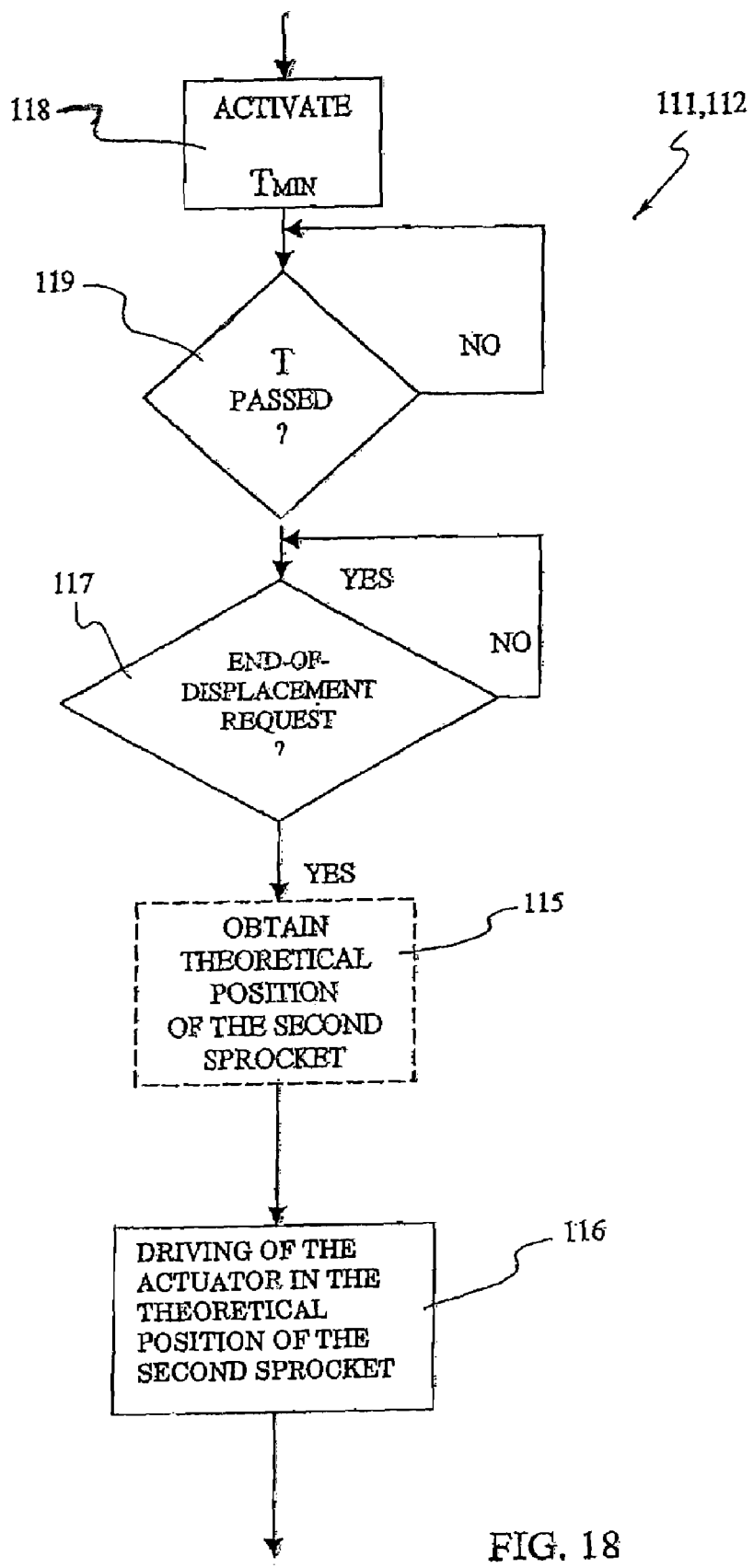

In a third embodiment of the step of stay and repositioning 111, 112, illustrated in FIG. 18, the aforementioned step of driving the actuator 16, 17 to displace the guide element 14, 15 of the chain 13 in the theoretical position of the second sprocket 11, 12 (block 116) is subordinated to the receiving of an end-of-displacement-request signal, in turn subordinated to the passing of a predetermined minimum period of time after the step 109, 110 of driving the actuator 16, 17 to displace the guide element 14, 15 of the chain 13 in the gear-shifting position.

More specifically, the electronic control unit 40 takes care, in block 118, of activating a timer and, in a block 119, of monitoring the passing of a predetermined minimum time period Tmin. As for the timer, the considerations outlined above with reference to the embodiment of FIG. 16 are valid.

When the predetermined minimum time period Tmin has passed, the end-of-displacement-request signal (block 117) is waited for. In manual operation, it may happen that the release of the control 43-46 by the rider already takes place during the passing of the predetermined minimum time period Tmin (i.e. during the cyclic execution of block 119) and in such a case the electronic control unit 40 will take care of inhibiting or holding up the end-of-displacement-request signal until the predetermined minimum time period Tmin has passed.

Once the two-fold condition that the predetermined minimum time period Tmin has passed and that the end-of-displacement-request signal has been received by the electronic control unit 40 has been met, if necessary (i.e. if step 105 or 106 has not previously been carried out) block 115 of obtaining the theoretical position of the second sprocket 11, 12 from the information stored in the front and rear memory means 49, 50 is carried out and then, in block 116, the aforementioned step of driving the actuator 16, 17 to displace the chain 13 until the counter 47, 48 reaches the theoretical position of the second sprocket 11, 12 is carried out.

Figure 19:
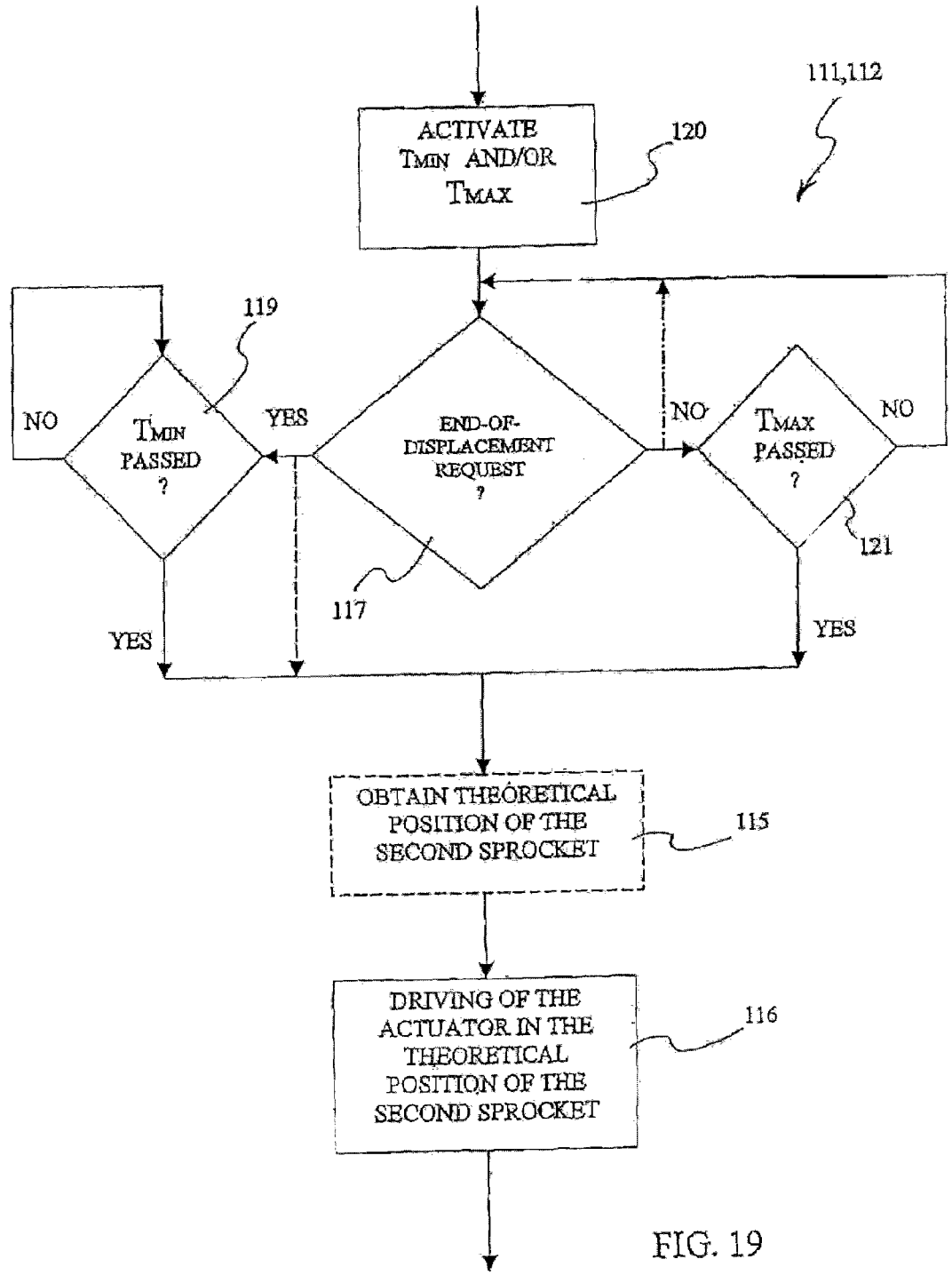

In a fourth embodiment of the step of stay and repositioning 111, 112, illustrated in FIG. 19, the aforementioned step of driving the actuator 16, 17 to displace the guide element 14, 15 of the chain 13 in the theoretical position of the second sprocket 11, 12 (block 116) takes place once an end-of-displacement-request signal has been received, but subordinated to the passing of a predetermined minimum period of time and to the passing of a predetermined maximum period of time. In other words, driving step 116 is carried out at the latest in time of the receiving of end-of-displacement-request signal and the passing of the predetermined minimum time period if the end-of-displacement-request signal is received before the predetermined maximum time period has passed, or else when the predetermined maximum time period has passed if the end-of-displacement-request signal has not yet been received. In such a case, the electronic control unit 40 shall ignore the end-of-displacement-request signal received thereafter.

More specifically, the electronic control unit 40 first, in block 120, activates one count-up timer or two count-down timers, one set at a predetermined minimum time period Tmin and the other set at a predetermined maximum time period Tmax.

The electronic control unit 40 then monitors (block 117) the receiving of the end-of-displacement-request signal. While the end-of-displacement-request signal has not been received (output NO of block 117), the electronic control unit 40 monitors, in a block 121, the passing of the predetermined maximum time period Tmax. While the predetermined maximum time period Tmax has not passed (output NO in block 121), the electronic control unit continues to monitor the receiving of the end-of-displacement-request signal (return to block 117).

When the predetermined maximum time period Tmax has passed without the end-of-displacement-request signal having been received (output NO of block 117 and output YES of block 121), if necessary (i.e. if step 105 or 106 has not been carried out previously) the step (block 115) of obtaining the theoretical position of the second sprocket 11, 12 from the information stored in the front and rear memory means 49, 50 is carried out and then, in block 116, the aforementioned step of driving the actuator 16, 17 to displace the chain 13 until the counter 47, 48 reaches the theoretical position of the second sprocket 11, 12 is carried out.

If, on the other hand, the end-of-displacement-request signal is received (output YES of block 117) before it has been checked, in the previous cycle, that the predetermined maximum time period Tmax has passed, the electronic control unit 40 checks the passing of the predetermined minimum time period Tmin (block 119).

If the predetermined minimum time period Tmin has not yet passed (output NO of block 119), the electronic control unit 40 continues to monitor the passing of such a predetermined minimum time period Tmin remaining at block 119. If, on the other hand, when the end-of-displacement-request signal is received the predetermined minimum time period Tmin has passed, or as soon as such a period has passed (output YES of block 119), if necessary the step (block 115) of obtaining the theoretical position of the second sprocket 11, 12 is carried out and then, in block 116, the step of driving the actuator 16, 17 to displace the chain 13 until the counter 47, 48 reaches the theoretical position of the second sprocket 11, 12 is carried out.

The provision of a predetermined maximum time period Tmax, after the passing of which the driving step 116 is carried out independently of the receiving of the end-of-displacement-request signal, is advantageous since, as mentioned, an excessive amount of time in the gear-shifting position could damage the mechanics of the gearshift 8 and turn out to be dangerous for the rider.

In a fifth embodiment the step of stay and repositioning 111, 112 provides for the checking of the passing of the predetermined maximum time period Tmax, but not the checking of the passing of the predetermined minimum time period Tmin. In other words, the block 119 of FIG. 19 is absent and when the end-of-displacement-request signal has been received, it passes directly to the step of obtaining the theoretical position of the second sprocket, if necessary (block 115), and to the step of driving the actuator (block 116), as indicated by the dashed arrow in FIG. 19.

In a sixth embodiment the step of stay and repositioning 111, 112 provides for the checking of the passing of the predetermined minimum time period Tmin, but not the checking of the passing of the predetermined maximum time period Tmax. In other words, the block 121 of FIG. 19 is absent and until the end-of-displacement-request signal has been received, it remains in block 117, as indicated by the phantom arrow in FIG. 19.

The step of activating the timer(s) 113, 118, 120 can, in alternative embodiments which are not shown, be carried out before the step 109, 110 of driving the actuator 16, 17 to displace the guide element 14, 15 of the chain 13 in the gear-shifting position.

The step of stay and repositioning 111, 112 is optional, not just in that the gear-shifting position for certain pairs of a first and second sprocket 11, 12 can correspond to the theoretical position of the second sprocket 11, 12. Indeed, in general the gear-shifting positions differ from the theoretical positions by sufficiently small amounts (offset or overstroke) as not to interfere with the correct motion of the bicycle 1 in case the chain 14, 15 is left in the gear-shifting position until the next gear-shifting request.

The sequentiality of the execution of blocks 117, 119, 121 does not necessarily have to correspond to sequential instructions in the program implementing the method, these blocks being able to be managed by "interrupts."

In the various aforementioned embodiments, the values of the theoretical positions of the sprockets or of the differential amounts from which they derive, the values of the amounts of overstroke and/or the values of the gear-shifting positions, as well as the values of the time periods of the optional step of stay and repositioning, are preset in the factory to default values. Preferably, the values listed above, or at least some of them, can however be modified by the user; in such a case it is suitable to provide for the possibility of returning to the default values (corresponding to nominal or average values), suitably stored in read-only memory means.

More specifically, the electronically servo-assisted gearshift 8, and in particular its electronic control unit 40, is suitable to operate, besides in the normal ride operating mode, in other operating modes, including a programming mode of the microprocessor(s) of the electronic control unit 40, a diagnostics mode, a "choice-of-operation mode" in which it is possible to choose between manual, automatic or semi-automatic control of the gearshift, for example as described in U.S. Pat. No. 5,865,454, and a setting mode.

The various operating modes are selected through manual mode selection command means, forming a user interface with the electronic control unit 40, preferably in cooperation with the display unit 60. The manual mode selection command means preferably comprise two buttons 61, 62, arranged at the display unit 60. The user interface can of course comprise other buttons or levers, such as the button 63, at the display unit 60 and/or at the grips of the handlebar 70, used in the other operating modes.

For example, when the rider presses the button 61 arranged centrally under the display unit 60, the electronic control unit 40 shows on the display unit 60 the various operating modes in cyclical sequence and the mode selection means comprises the same button 61 for accepting the operating mode currently displayed on the display unit 60 and a button, for example the button 62 to the right of the display unit 60, to not accept it and cause the display of the next operating mode.

Alternatively, the electronic control unit 40 shows on the display unit 60 a menu containing all the various operating modes, and the mode selection means comprises a button for scrolling a selection cursor cyclically in the menu, or two buttons to scroll the selection cursor in the menu in the two directions, as well as a button for accepting the operating mode upon which the selection cursor is currently displayed.

The buttons for accepting and not accepting the operating mode, or the buttons for scrolling the cursor, can also be embodied by the same upwards and downwards gear-shifting request commands 43, 44 or 45, 46, the electronic control unit 40 suitably interpreting the signal generated by the pressing of the buttons according to the context, for example through logic gates or Boolean functions.

Figure 20:
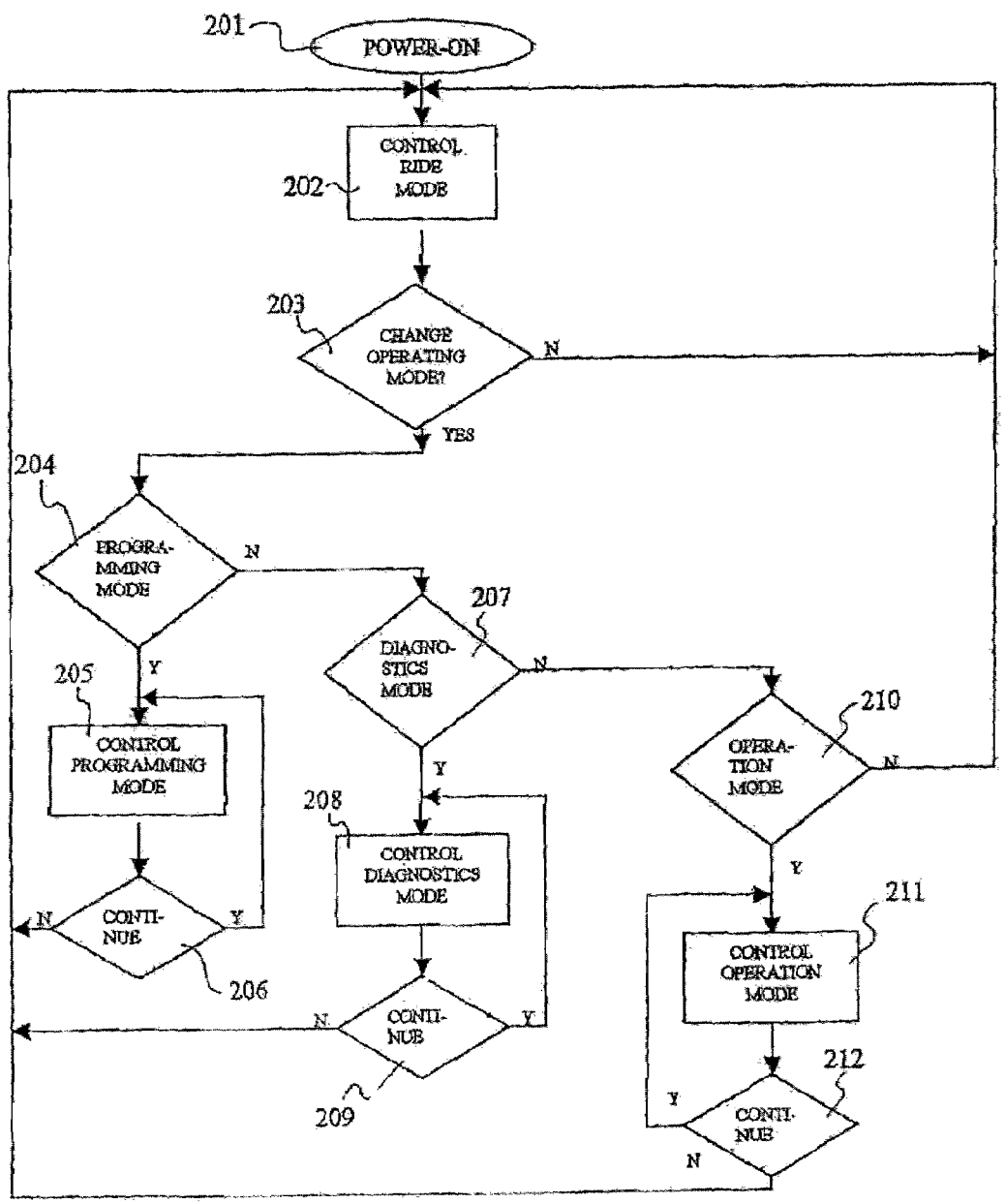
FIG. 20 shows a flow chart exemplifying a mode selection of the gearshift.

A flow chart exemplifying the mode selection of the gearshift 8 is represented in FIG. 20. When switched on, 101, the electronic control unit 40 enters a block 202 for managing the normal ride operating mode, in particular in manual operation. The system remains in this mode, in which it waits for and manages the signals coming from the gear-shifting request commands 43-46 in the way above described, negatively answering to the block 203 querying whether to change the operating mode. In the query block 203 a mode selection request signal, generated by one of the manual input commands, in particular by the pressing of the button 61, is monitored.

In case the mode selection request signal is activated, output Yes from the query block 203, the electronic control unit 40 queries in a block 204 whether one wishes to enter into a programming mode and, in the affirmative case, controls such a mode in a block 205 remaining there until it receives a negative answer to a block 206 requesting whether one wishes to continue, returning to the block 202 for controlling the normal ride operating mode. In the case of a negative answer to block 204, the electronic control unit 40 queries in a block 207 whether one wishes to enter into a diagnostics mode and, in the affirmative case, controls such a mode in a block 208 remaining there until it receives a negative answer to a block 209 requesting whether one wishes to continue, returning to block 202 for controlling the normal ride operating mode. In the case of a negative answer to block 207, the electronic control unit 40 queries in a block 210 whether one wishes to enter into the aforementioned operation mode selection and, in the affirmative case, controls such a mode in a block 211 remaining there until it receives a negative answer to a block 212 requesting whether one wishes to continue, returning to block 202 for controlling the normal ride operating mode, in particular in manual, semi-automatic or automatic operation as chosen by the rider.

The values of the theoretical positions of the sprockets or of the differential amounts from which they derive, the values of the amounts of overstroke and/or the values of the gear-shifting positions can be corrected to take into account misalignments with respect to the chain 13 of the gearshift group 9, 10 overall and/or misalignments of the sprockets 11, 12 of the gearshift group 9, 10 with respect to each other, for example as illustrated in U.S. patent application Ser. Nos. 10/664,305 and 10/663,231 filed on Sep. 15, 2003 and Sep. 16, 2003 respectively. The descriptions of the aforementioned applications are here incorporated by reference. (The applications have not been published at this time.)

The microprocessor(s) electronic control unit 40 can, for example, be made in C-MOS technology, which has the advantage of having low consumption.

As an alternative to implementation through dedicated hardware, the functionalities of the electronic control unit 40 described above can be accomplished by a software program loadable in a small computer.

What is claimed is:

1. A method for electronically servo-assisting an electronically servo-assisted bicycle gearshift, comprising the steps of:
   a) receiving a signal requesting a displacement of a chain of a bicycle gearshift from a first sprocket to a second sprocket of a gearshift group comprising at least two sprockets,
   b1) if the first sprocket has a smaller diameter than the second sprocket, obtaining an upwards gear-shifting position for the second sprocket,
   b2) if the first sprocket has a larger diameter than the second sprocket, obtaining a downwards gear-shifting position for the second sprocket, and
   c) driving an actuator of the gearshift group in response to the signal to displace a guide element of the chain in an axial direction with respect to the gearshift group from the first sprocket to the upwards gear-shifting position for the second sprocket or to the downwards gear-shifting position for the second sprocket, respectively.

2. The method of claim 1 wherein the upwards gear-shifting position for the second sprocket and the downwards gear-shifting position for the second sprocket are substantially asymmetrically distant from a theoretical position of the second sprocket.

3. The method of claim 1 wherein the step b1) of obtaining the upwards gear-shifting position for the second sprocket comprises the step of:
   b11) obtaining a theoretical position of the second sprocket.

4. The method of claim 3 wherein the step b1) of obtaining the upwards gear-shifting position for the second sprocket also comprises the step of:
   b12) algebraically adding a predetermined amount of overstroke to the theoretical position for the second sprocket.

5. The method of claim 1 wherein the step b2) of obtaining the downwards gear-shifting position for the second sprocket comprises the step of:
   b21) obtaining a theoretical position of the second sprocket.

6. The method of claim 5 wherein the step b2) of obtaining the downwards gear-shifting position for the second sprocket also comprises the step of:
   b22) algebraically adding a predetermined amount of overstroke to the theoretical position of the second sprocket.

7. The method of claim 1 further comprising the sequential steps of:
- c1) temporarily maintaining the position of the chain guide element obtained in step c), and
- d) driving the actuator of the gearshift group to displace the chain guide element in the axial direction with respect to the gearshift group from the gear-shifting position to a theoretical position of the second sprocket.

8. The method of claim 7 wherein the step c1) of temporarily maintaining the position comprises the step of:
- e) waiting a predetermined time period.

9. The method of claim 7 wherein the step c1) of temporarily maintaining the position comprises the step of:
- f) waiting for an end-of-displacement-request signal.

10. The method of claim 7 wherein the step c1) of temporarily maintaining the position comprises the sequential steps of:
- g) waiting a predetermined minimum time period, and
- f) waiting for an end-of-displacement-request signal.

11. The method of claim 7 wherein the step c1) of temporarily maintaining the position comprises the steps of:
- h) monitoring the passing of a predetermined minimum time period,
- i) monitoring the receiving of an end-of-displacement-request signal,
- wherein the execution of step d) takes place at the latest in time between the receiving of the end-of-displacement-request signal and the passing of the predetermined minimum time period.

12. The method of claim 7 wherein the step c1) of temporarily maintaining the position comprises the steps of:
- i) monitoring the receiving of an end-of-displacement-request signal,
- j) monitoring the passing of a predetermined maximum time period,
- wherein the execution of step d) takes place at the first in time between the receiving of the end-of-displacement-request signal and the passing of the predetermined maximum time period.

13. The method of claim 7 wherein the step c1) of temporarily maintaining the position comprises the steps of:
- h) monitoring the passing of a predetermined minimum time period,
- i) monitoring the receiving of an end-of-displacement-request signal,
- j) monitoring the passing of a predetermined maximum time period,
- wherein the execution of step d) takes place at the latest in time between the receiving of the end-of-displacement-request signal and the passing of the predetermined minimum time period if the receiving of the end-of-displacement-request signal precedes in time the passing of the predetermined maximum time period, or upon the passing of the predetermined maximum time period if it precedes the receiving of the end-of-displacement-request signal.

14. The method of claim 1 further comprising a step of setting a value of each of said or each gear-shifting positions or of said or of each of said amounts of overstroke and/or of said or of each of said predetermined time periods.

15. A program for electronically servo-assisting a bicycle gearshift, comprising program code means suitable for carrying out the steps of the method of claim 1 when the program is run on a computer, embodied in at least one microcontroller.

16. An electronic circuit suitable for carrying out the steps of the method of claim 1.

17. A program embodied on a readable medium for electronically servo-assisting a bicycle gearshift, the program being run on a computer and comprising the following steps:
- a) receiving a signal requesting a displacement of a chain of a bicycle gearshift from a first sprocket to a second sprocket of a gearshift group comprising at least two sprockets,
- b1) if the first sprocket has a smaller diameter than the second sprocket, obtaining an upwards gear-shifting position for the second sprocket,
- b2) if the first sprocket has a larger diameter than the second sprocket, obtaining a downwards gear-shifting position for the second sprocket, and
- c) driving an actuator of the gearshift group in response to the signal to displace a guide element of the chain in an axial direction with respect to the gearshift group from the first sprocket to the upwards gear-shifting position for the second sprocket or to the downwards gear-shifting position for the second sprocket, respectively.

18. An electronic circuit that carries out the following steps:
- a) receiving a signal requesting a displacement of a chain of a bicycle gearshift from a first sprocket to a second sprocket of a gearshift group comprising at least two sprockets,
- b1) if the first sprocket has a smaller diameter than the second sprocket, obtaining an upwards gear-shifting position for the second sprocket,
- b2) if the first sprocket has a larger diameter than the second sprocket, obtaining a downwards gear-shifting position for the second sprocket, and
- c) driving an actuator of the gearshift group in response to the signal to displace a guide element of the chain in an axial direction with respect to the gearshift group from the first sprocket to the upwards gear-shifting position for the second sprocket or to the downwards gear-shifting position for the second sprocket, respectively.

19. A method for electronically servo-assisting an electronically servo-assisted bicycle gearshift, comprising the steps of:
- a) receiving a signal requesting a displacement of a chain of a bicycle gearshift from a first sprocket to a second sprocket of a gearshift group comprising at least two sprockets,
- b1) if the first sprocket has a smaller diameter than the second sprocket, obtaining an upwards gear-shifting position for the second sprocket,
- b2) if the first sprocket has a larger diameter than the second sprocket, obtaining a downwards gear-shifting position for the second sprocket through:
  - b21) obtaining a theoretical position of the second sprocket;
  - b22) adding a predetermined amount of overstroke to the theoretical position for the second sprocket, and
- c) driving an actuator of the gearshift group in response to the signal to displace a guide element of the chain in an axial direction with respect to the gearshift group from the first sprocket to the upwards gear-shifting position for the second sprocket or to the downwards gear-shifting position for the second sprocket, respectively.

20. A method for electronically servo-assisting an electronically servo-assisted bicycle gearshift, comprising the steps of:
- a) receiving a signal requesting a displacement of a chain of a bicycle gearshift from a first sprocket to a second sprocket of a sprocket set, b1) if the first sprocket has a smaller diameter than the second sprocket, obtaining an upwards gear-shifting position for the second sprocket, b2) if the first sprocket has a larger diameter than the second sprocket, obtaining a downwards gear-shifting position for the second sprocket through:
- b21) obtaining a theoretical position of the second sprocket;
- b22) adding a predetermined amount of overstroke to the theoretical position of the second sprocket, and c) driving an actuator in response to the signal to displace a guide element of the chain in an axial direction with respect to the sprocket set from the first sprocket to the upwards gear-shifting position for the second sprocket or to the downwards gear-shifting position for the second sprocket, respectively.

\* \* \* \* \*